US010392120B2

(12) United States Patent
Niergarth et al.

(10) Patent No.: US 10,392,120 B2
(45) Date of Patent: Aug. 27, 2019

(54) PROPULSION ENGINE FOR AN AIRCRAFT (71) Applicant: General Electric Company, Schenectady, NY (US)

(72) Inventors: Daniel Alan Niergarth, Cincinnati, OH (US); Randy M. Vondrell, Cincinnati, OH (US); Brandon Wayne Miller, Liberty Township, OH (US); Patrick Michael Marrinan, Mason, OH (US)

(73) Assignee: General Electric Company, Schenectady, NY (US)

( * ) Notice: Subject to any disclaimer, the term of this patent is extended or adjusted under 35 U.S.C. 154(b) by 336 days.

(21) Appl. No.: 15/132,298

(22) Filed: Apr. 19, 2016

(65) Prior Publication Data
US 2017/0297727 A1 Oct. 19, 2017

(51) Int. Cl.
*B64D 27/24* (2006.01)
*B64D 27/02* (2006.01)
*B64D 27/18* (2006.01)
*F02C 3/04* (2006.01)
*F02C 7/20* (2006.01)
(Continued)

(52) U.S. Cl.
CPC ............. *B64D 27/24* (2013.01); *B64D 27/02* (2013.01); *B64D 27/18* (2013.01); *F02C 3/04* (2013.01);
(Continued)

(58) Field of Classification Search
CPC ........ B64D 27/02; B64D 27/18; B64D 27/24; B64D 2027/026; F02C 3/04; F02C 7/20; F02C 7/36; F02K 3/04
(Continued)

(56) References Cited

U.S. PATENT DOCUMENTS

| 2,812,912 A | 11/1957 | Stevens et al. |
| 3,286,470 A | 11/1966 | Gerlaugh |

(Continued)

FOREIGN PATENT DOCUMENTS

| EP | 1 069 044 B1 | 9/2005 |
| EP | 2 998 557 A1 | 3/2016 |

(Continued)

OTHER PUBLICATIONS

Extended European Search Report and Opinion issued in connection with corresponding EP Application No. 17164942.9 dated Sep. 5, 2017.

(Continued)

*Primary Examiner* — Richard R. Green
*Assistant Examiner* — Brady W Frazier
(74) *Attorney, Agent, or Firm* — Dority & Manning, P.A.

(57) ABSTRACT

A propulsion system for an aircraft is provided having a propulsion engine configured to be mounted to the aircraft. The propulsion engine includes an electric machine defining an electric machine tip speed during operation. The propulsion system additionally includes a fan rotatable about a central axis of the electric propulsion engine with the electric machine. The fan defines a fan pressure ratio, $R_{FP}$, and includes a plurality of fan blades, each fan blade defining a fan blade tip speed. The electric propulsion engine defines a ratio of the fan blade tip speed to electric machine tip speed that is within twenty percent of the equation, $1.68 \times R_{FP} - 0.518$, such that the propulsion engine may operate at a desired efficiency.

20 Claims, 4 Drawing Sheets (51) Int. Cl.
*F02C 7/36* (2006.01)
*F02K 3/04* (2006.01)

(52) U.S. Cl.
CPC ................. *F02C 7/20* (2013.01); *F02C 7/36* (2013.01); *F02K 3/04* (2013.01); *B64D 2027/026* (2013.01); *F05D 2220/76* (2013.01); *Y10S 903/905* (2013.01); *Y10S 903/906* (2013.01); *Y10S 903/907* (2013.01)

(58) Field of Classification Search
USPC .......................................................... 244/58
See application file for complete search history.

(56) References Cited

U.S. PATENT DOCUMENTS

| | | | |
|---|---|---|---|
| 3,312,448 A | 4/1967 | Hull, Jr. et al. | |
| 3,844,110 A | 10/1974 | Widlansky et al. | |
| 4,089,493 A | 5/1978 | Paulson | |
| 4,446,696 A | 5/1984 | Sargisson et al. | |
| 4,605,185 A | 8/1986 | Reyes | |
| 4,704,862 A | 11/1987 | Dennison et al. | |
| 4,815,273 A | 3/1989 | Rudolph et al. | |
| 4,913,380 A | 4/1990 | Verdaman et al. | |
| 5,183,222 A * | 2/1993 | Ramsey, Jr. | B64D 27/24 244/53 R |
| 5,927,644 A | 7/1999 | Ellis et al. | |
| 6,247,668 B1 | 6/2001 | Reysa et al. | |
| 6,732,502 B2 * | 5/2004 | Seda | F01D 5/03 60/226.1 |
| 6,976,655 B2 | 12/2005 | Thompson | |
| 7,267,300 B2 | 9/2007 | Heath et al. | |
| 7,387,189 B2 | 6/2008 | James et al. | |
| 7,493,754 B2 | 2/2009 | Moniz et al. | |
| 7,665,689 B2 | 2/2010 | McComb | |
| 7,752,834 B2 | 7/2010 | Addis | |
| 7,806,363 B2 | 10/2010 | Udall et al. | |
| 7,819,358 B2 | 10/2010 | Belleville | |
| 7,905,449 B2 | 3/2011 | Cazals et al. | |
| 7,976,273 B2 | 7/2011 | Suciu et al. | |
| 8,033,094 B2 | 10/2011 | Suciu et al. | |
| 8,099,944 B2 | 1/2012 | Foster et al. | |
| 8,109,073 B2 | 2/2012 | Foster et al. | |
| 8,128,019 B2 | 3/2012 | Annati et al. | |
| 8,162,254 B2 | 4/2012 | Roche | |
| 8,220,739 B2 | 7/2012 | Cazals | |
| 8,226,040 B2 | 7/2012 | Neto | |
| 8,291,716 B2 | 10/2012 | Foster et al. | |
| 8,317,126 B2 | 11/2012 | Harris et al. | |
| 8,324,746 B2 | 12/2012 | Bradbrook | |
| 8,469,306 B2 | 6/2013 | Kuhn, Jr. | |
| 8,492,920 B2 | 7/2013 | Huang et al. | |
| 8,549,833 B2 | 10/2013 | Hyde et al. | |
| 8,552,575 B2 | 10/2013 | Teets et al. | |
| 8,596,036 B2 | 12/2013 | Hyde et al. | |
| 8,640,439 B2 | 2/2014 | Hoffjann et al. | |
| 8,672,263 B2 | 3/2014 | Stolte | |
| 8,684,304 B2 | 4/2014 | Burns et al. | |
| 8,723,349 B2 | 5/2014 | Huang et al. | |
| 8,723,385 B2 | 5/2014 | Jia et al. | |
| 8,857,191 B2 | 10/2014 | Hyde et al. | |
| 8,890,343 B2 | 11/2014 | Bulin et al. | |
| 8,939,399 B2 | 1/2015 | Kouros et al. | |
| 8,998,580 B2 | 4/2015 | Quiroz-Hernandez | |
| 9,038,398 B2 | 5/2015 | Suciu et al. | |
| 9,174,741 B2 * | 11/2015 | Suntharalingam | B64D 27/02 |
| 9,776,714 B2 * | 10/2017 | Shapery | B64C 29/0075 |
| 2006/0260323 A1 * | 11/2006 | Moulebhar | F01D 21/003 60/793 |
| 2009/0145998 A1 * | 6/2009 | Salyer | B64C 27/04 244/17.23 |
| 2010/0038473 A1 | 2/2010 | Schneider et al. | |
| 2010/0207478 A1 * | 8/2010 | Dev | H02K 7/14 310/156.34 |
| 2010/0219779 A1 * | 9/2010 | Bradbrook | F02C 3/113 318/153 |
| 2010/0329844 A1 * | 12/2010 | Bradbrook | F02C 7/36 415/61 |
| 2011/0024555 A1 * | 2/2011 | Kuhn, Jr. | B64C 29/0033 244/17.25 |
| 2012/0119020 A1 | 5/2012 | Burns et al. | |
| 2012/0153076 A1 | 6/2012 | Burns et al. | |
| 2012/0209456 A1 | 8/2012 | Harmon et al. | |
| 2013/0032215 A1 | 2/2013 | Streifinger | |
| 2013/0036730 A1 | 2/2013 | Bruno et al. | |
| 2013/0052005 A1 | 2/2013 | Cloft | |
| 2013/0062885 A1 | 3/2013 | Taneja | |
| 2013/0088019 A1 | 4/2013 | Huang et al. | |
| 2013/0094963 A1 | 4/2013 | Rolt | |
| 2013/0099065 A1 | 4/2013 | Stuhlberger | |
| 2013/0125561 A1 * | 5/2013 | Schwarz | F02C 6/00 60/802 |
| 2013/0139515 A1 | 6/2013 | Schlak | |
| 2013/0154359 A1 | 6/2013 | Huang et al. | |
| 2013/0184958 A1 | 7/2013 | Dyrla et al. | |
| 2013/0227950 A1 | 9/2013 | Anderson et al. | |
| 2013/0251525 A1 | 9/2013 | Saiz | |
| 2013/0306024 A1 | 11/2013 | Rolt | |
| 2014/0010652 A1 | 1/2014 | Suntharalingam et al. | |
| 2014/0060995 A1 | 3/2014 | Anderson et al. | |
| 2014/0151495 A1 | 6/2014 | Kuhn, Jr. | |
| 2014/0250861 A1 | 9/2014 | Eames | |
| 2014/0283519 A1 | 9/2014 | Mariotto et al. | |
| 2014/0290208 A1 | 10/2014 | Rechain et al. | |
| 2014/0339371 A1 | 11/2014 | Yates et al. | |
| 2014/0345281 A1 | 11/2014 | Galbraith | |
| 2014/0346283 A1 | 11/2014 | Salyer | |
| 2014/0360206 A1 * | 12/2014 | Bradbrook | F02C 7/32 60/797 |
| 2014/0367510 A1 | 12/2014 | Viala et al. | |
| 2014/0367525 A1 | 12/2014 | Salyer | |
| 2014/0369810 A1 | 12/2014 | Binks et al. | |
| 2015/0000252 A1 * | 1/2015 | Moore | F02K 1/44 60/204 |
| 2015/0013306 A1 * | 1/2015 | Shelley | F02K 5/00 60/224 |
| 2015/0028594 A1 * | 1/2015 | Mariotto | H02K 7/006 290/52 |
| 2015/0093272 A1 * | 4/2015 | Komer | B64C 11/38 417/423.1 |
| 2015/0151844 A1 | 6/2015 | Anton et al. | |
| 2015/0284071 A1 | 10/2015 | Veilleux, Jr. et al. | |
| 2015/0314865 A1 * | 11/2015 | Bermond | B64C 29/0033 244/17.27 |
| 2015/0380999 A1 | 12/2015 | Joshi et al. | |
| 2016/0010589 A1 * | 1/2016 | Rolt | F01D 13/003 60/226.1 |
| 2016/0332741 A1 * | 11/2016 | Moxon | B64C 15/00 |
| 2017/0291693 A1 | 10/2017 | Niergarth et al. | |
| 2017/0292523 A1 | 10/2017 | Niergarth et al. | |
| 2017/0297728 A1 | 10/2017 | Niergarth et al. | |

FOREIGN PATENT DOCUMENTS

| | | |
|---|---|---|
| EP | 3 048 042 A1 | 7/2016 |
| EP | 3 144 216 A1 | 3/2017 |
| EP | 3 153 401 A1 | 4/2017 |
| GB | 2489311 A | 9/2012 |
| JP | S58-12899 A | 1/1983 |
| JP | S61-275550 A | 12/1986 |
| JP | H11-34990 A | 2/1999 |
| JP | H11-200888 A | 7/1999 |
| WO | WO2010/020199 A1 | 2/2010 |
| WO | WO2014/072615 A1 | 5/2014 |

OTHER PUBLICATIONS

Niergarth, D. A., et al., Propulsion Engine for an Aircraft, GE Co-Pending U.S. Appl. No. 15/241,157, filed Aug. 19, 2016.
Niergarth, D. A., et al., Propulsion Engine for an Aircraft, GE Co-Pending U.S. Appl. No. 15/241,168, filed Aug. 19, 2016.

(56) References Cited

OTHER PUBLICATIONS http://aviationweek.com/awin/boeing-researchers-alternative-propulsion-and-fuel-options, Aviation Week & Space Technology, Jun. 4, 2012.
Bradley et al., "Subsonic Ultra Green Aircraft Research, Phase II: N+4 Advanced Concept Development," NASA/CR-2012-217556, May 2012.
Machine translation and Notification of reasons for refusal issued in connection with corresponding JP Application No. 2017-077896 on Jul. 17, 2018.

* cited by examiner

PROPULSION ENGINE FOR AN AIRCRAFT

FIELD OF THE INVENTION

The present subject matter relates generally to an aircraft propulsion system including an electric propulsion engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines, also has an effect on the net propulsive thrust of the aircraft. A total amount of drag on the aircraft, including skin friction, form, and induced drag, is generally proportional to a difference between a freestream velocity of air approaching the aircraft and an average velocity of a wake downstream from the aircraft that is produced due to the drag on the aircraft.

Systems have been proposed to counter the effects of drag and/or to improve an efficiency of the turbofan jet engines. For example, certain propulsion systems incorporate boundary layer ingestion systems to route a portion of relatively slow moving air forming a boundary layer across, e.g., the fuselage and/or the wings, into the turbofan jet engines upstream from a fan section of the turbofan jet engines. Although this configuration can reduce drag by reenergizing the boundary layer airflow downstream from the aircraft, the relatively slow moving flow of air from the boundary layer entering the turbofan jet engine generally has a nonuniform or distorted velocity profile. As a result, such turbofan jet engines can experience an efficiency loss minimizing or negating any benefits of reduced drag on the aircraft.

Accordingly, a propulsion system including one or more components for reducing an amount of drag on the aircraft would be useful. More particularly, a propulsion system including an efficient propulsion engine for reducing an amount of drag on the aircraft without causing any substantial decreases in an efficiency of the aircraft engines would be especially beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a propulsion system is provided for an aircraft having a fuselage and an aft end. The propulsion system includes a propulsion engine configured to be mounted to the aircraft. The propulsion engine defines a central axis and includes an electric machine defining an electric machine tip speed during operation of the propulsion engine. The propulsion engine additionally includes a fan rotatable about the central axis of the propulsion engine by the electric machine. The fan defines a fan pressure ratio ($R_{FP}$) and includes a plurality of fan blades. Each fan blade defines a fan blade tip speed during operation of the propulsion engine, the propulsion engine defining a ratio of fan blade tip speed to electric machine tip speed. During operation of the propulsion engine, the ratio of fan blade tip speed to electric machine tip speed is within twenty percent of the following equation: $1.68 \times R_{FP} - 0.518$.

In an exemplary aspect of the present disclosure, a method for operating a propulsion system for an aircraft is provided. The propulsion system includes a propulsion engine including an electric machine and a fan. The electric machine defines an electric machine tip speed and the fan defines a fan tip speed. The method includes operating the fan of the propulsion engine to define a fan pressure ratio ($R_{FP}$) greater than one and less than about three. A ratio of fan blade tip speed to electric machine tip speed is within twenty percent of the equation $1.68 \times R_{FP} - 0.518$.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft. The terms "upstream" and "downstream" refer to the relative direction with respect to fluid flow in a fluid pathway. For example, "upstream" refers to the direction from which the fluid flows, and "downstream" refers to the direction to which the fluid flows.

The present application is directed generally towards an electric propulsion engine having an electric motor and a fan configured for a desired efficiency and power density. The inventors of the present disclosure have discovered that coordinating a tip speed ratio (i.e., an electric machine tip speed relative to a fan blade tip speed) to a fan pressure ratio ($R_{FP}$) may provide a desired increase in efficiency and power density across a range of fan sizes and electric motor sizes for the electric propulsion engine. Specifically, the inventors have discovered that a desired efficiency may be achieved by configuring the tip speed ratio of the electric propulsion engine within about twenty percent (20%) of the equation $1.68 \times R_{FP} - 0.518$.

Figure 1:
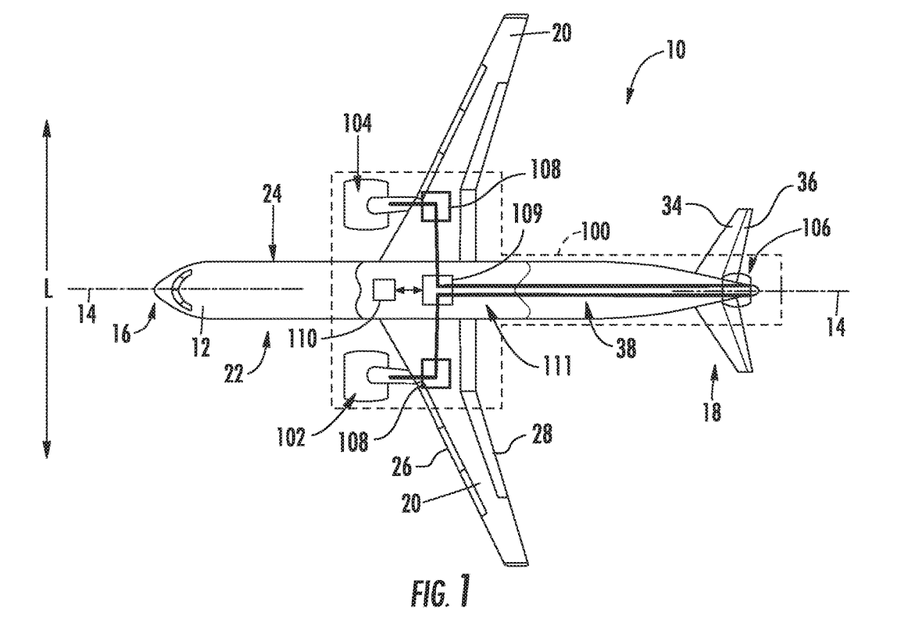
FIG. 1 is a top view of an aircraft according to various exemplary embodiments of the present disclosure.
Figure 2:
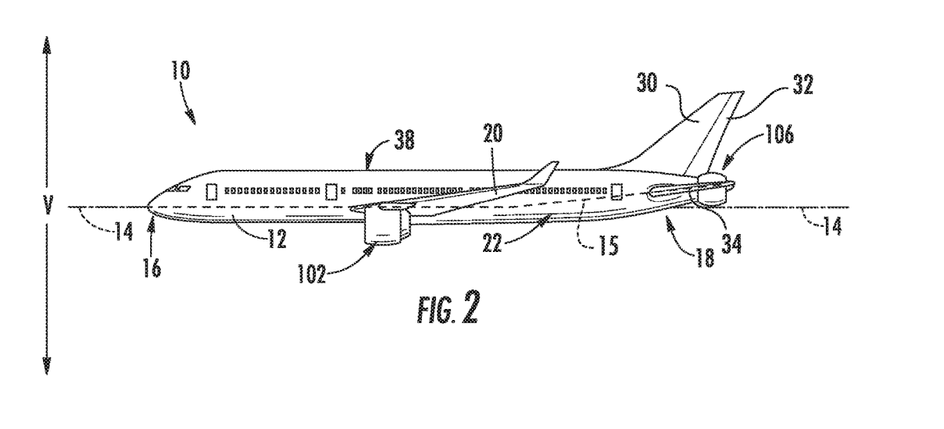
FIG. 2 is a port side view of the exemplary aircraft of FIG. 1

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18. Moreover, the aircraft 10 defines a mean line 15 extending between the forward end 16 and aft end 18 of the aircraft 10. As used herein, the "mean line" refers to a midpoint line extending along a length of the aircraft 10, not taking into account the appendages of the aircraft 10 (such as the wings 20 and stabilizers discussed below).

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap 32 for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIGS. 1 and 2 includes a propulsion system 100, herein referred to as "system 100". The exemplary system 100 includes one or more aircraft engines and one or more electric propulsion engines. For example, the embodiment depicted includes a plurality of aircraft engines, each configured to be mounted to the aircraft 10, such as to one of the pair of wings 20, and an electric propulsion engine. More specifically, for the embodiment depicted, the aircraft engines are configured as gas turbine engines, or rather as turbofan jet engines 102, 104 attached to and suspended beneath the wings 20 in an under-wing configuration. Additionally, the electric propulsion engine is configured to be mounted at the aft end of the aircraft 10, and hence the electric propulsion engine depicted may be referred to as an "aft engine." Further, the electric propulsion engine depicted is configured to ingest and consume air forming a boundary layer over the fuselage 12 of the aircraft 10. Accordingly, the exemplary aft engine depicted may be referred to as a boundary layer ingestion (BLI) fan 106. The BLI fan 106 is mounted to the aircraft 10 at a location aft of the wings 20 and/or the jet engines 102, 104. Specifically, for the embodiment depicted, the BLI fan 106 is fixedly connected to the fuselage 12 at the aft end 18, such that the BLI fan 106 is incorporated into or blended with a tail section at the aft end 18, and such that the mean line 15 extends therethrough. It should be appreciated, however, that in other embodiments the electric propulsion engine may be configured in any other suitable manner, and may not necessarily be configured as an aft fan or as a BLI fan.

Referring still to the embodiment of FIGS. 1 and 2, in certain embodiments the propulsion system further includes one or more electric generators 108 operable with the jet engines 102, 104. For example, one or both of the jet engines 102, 104 may be configured to provide mechanical power from a rotating shaft (such as an LP shaft or HP shaft) to the electric generators 108. Although depicted schematically outside the respective jet engines 102, 104, in certain embodiments, the electric generators 108 may be positioned within a respective jet engine 102, 104. Additionally, the electric generators 108 may be configured to convert the mechanical power to electrical power. For the embodiment depicted, the propulsion system 100 includes an electric generator 108 for each jet engine 102, 104, and also includes a power conditioner 109 and an energy storage device 110. The electric generators 108 may send electrical power to the power conditioner 109, which may transform the electrical energy to a proper form and either store the energy in the energy storage device 110 or send the electrical energy to the BLI fan 106. For the embodiment depicted, the electric generators 108, power conditioner 109, energy storage device 110, and BLI fan 106 are all are connected to an electric communication bus 111, such that the electric generator 108 may be in electrical communication with the BLI fan 106 and/or the energy storage device 110, and such that the electric generator 108 may provide electrical power to one or both of the energy storage device 110 or the BLI fan 106. Accordingly, in such an embodiment, the propulsion system 100 may be referred to as a gas-electric propulsion system.

It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner. For example, it should be appreciated that in various other embodiments, the BLI fan 106 may alternatively be positioned at any suitable location proximate the aft end 18 of the aircraft 10. Further, in still other embodiments the electric propulsion engine may not be positioned at the aft end of the aircraft 10, and thus may not be configured as an "aft engine." For example, in other embodiments, the electric propulsion engine may be incorporated into the fuselage of the aircraft 10, and thus configured as a "podded engine," or pod-installation engine. Further, in still other embodiments, the electric propulsion engine may be incorporated into a wing of the aircraft 10, and thus may be configured as a "blended wing engine."

Moreover, in other embodiments, the electric propulsion engine may not be a boundary layer ingestion fan, and instead may be mounted at any suitable location on the aircraft 10 as a freestream injection fan. Furthermore, in still other embodiments, the propulsion system 100 may not include, e.g., the power conditioner 109 and/or the energy storage device 110, and instead the generator(s) 108 may be directly connected to the BLI fan 106.

Figure 3:
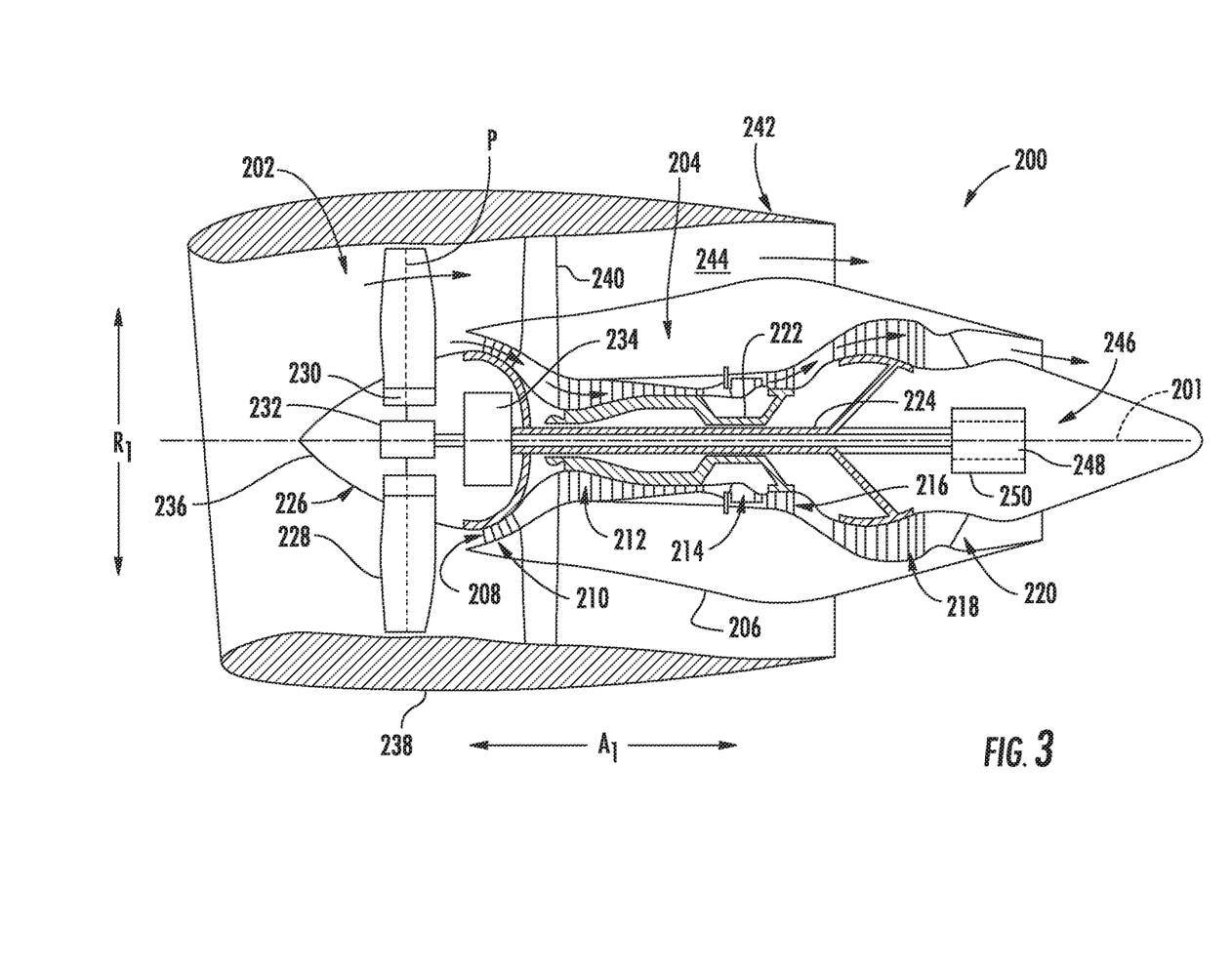
FIG. 3 is a schematic, cross-sectional view of a gas turbine engine mounted to the exemplary aircraft of FIG. 1.

Referring now to FIG. 3, a schematic cross-sectional view of a propulsion engine in accordance with an exemplary embodiment of the present disclosure is provided. In certain exemplary embodiments, the propulsion engine may be configured a high-bypass turbofan jet engine 200, herein referred to as "turbofan 200." Notably, in at least certain embodiments, the jet engines 102, 104 may be also configured as high-bypass turbofan jet engines. In various embodiments, the turbofan 200 may be representative of jet engines 102, 104. Alternatively, however, in other embodiments, the turbofan 200 may be incorporated into any other suitable aircraft 10 or propulsion system 100.

As shown in FIG. 3, the turbofan 200 defines an axial direction A1 (extending parallel to a longitudinal centerline 201 provided for reference) and a radial direction R1. In general, the turbofan 200 includes a fan section 202 and a core turbine engine 204 disposed downstream from the fan section 202.

The exemplary core turbine engine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction R1. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal axis 12 by LP shaft 224 across a power gear box 234. The power gear box 234 includes a plurality of gears for stepping down the rotational speed of the LP shaft 224 to a more efficient rotational fan speed. Additionally, it will be appreciated that the fan 226 generally defines a fan pressure ratio (i.e., a fan pressure ratio rating for the fan, such as a maximum fan pressure ratio of the fan as may be achieved through an entire flight envelope), and that the plurality of fan blades 228 each define a fan blade tip speed at an outer tip along the radial direction R1.

Referring still to the exemplary embodiment of FIG. 3, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the core turbine engine 204. It should be appreciated that the nacelle 238 may be configured to be supported relative to the core turbine engine 204 by a plurality of circumferentially-spaced outlet guide vanes 240. Moreover, a downstream section 242 of the nacelle 238 may extend over an outer portion of the core turbine engine 204 so as to define a bypass airflow passage 244 therebetween.

Additionally, the exemplary turbofan 200 depicted includes an electric machine 246 rotatable with the fan 226. Specifically, for the embodiment depicted, the electric machine 246 is configured as an electric generator co-axially mounted to and rotatable by the LP shaft 224 (the LP shaft 224 also rotating the fan 226 through, for the embodiment depicted, the power gearbox 234). The electric machine 246 includes a rotor 248 and a stator 250. As will be appreciated, the rotor 248 may be attached to the LP shaft 224 and the stator 250 may remain static within the core turbine engine 204. During operation, the electric machine may define an electric machine tip speed (i.e., a linear speed of the rotor 248 at a radially outer edge of the rotor). Notably, when the turbofan engine 200 is integrated into the propulsion system 100 described above with reference to FIGS. 1 and 2, the electric generators 108 may be configured in substantially the same manner as the electric machine 246 of FIG. 3.

Further, in still other embodiments, the turbofan engine 200 may be designed such that a ratio of the fan blade tip speed to electric machine tip speed may have a specific relationship to the fan pressure ratio. Notably, the relationship of these factors described below in the context of the electric propulsion device 300, may also apply to the relationship of these factors described with respect to the turbofan engine 200 (i.e., the relationship of the ratio of the fan blade tip speed to electric machine tip speed of the turbofan engine 200 to the fan pressure ratio of the turbofan engine 200).

It should be also appreciated, however, that the exemplary turbofan engine 200 depicted in FIG. 3 is by way of example only, and that in other exemplary embodiments, the turbofan engine 200 may have any other suitable configuration. Further, it should be appreciated, that in other exemplary embodiments, the jet engines 102, 104 may instead be configured as any other suitable aeronautical engine, such as a turboprop engine, turbojet engine, internal combustion engine, etc.

Figure 4:
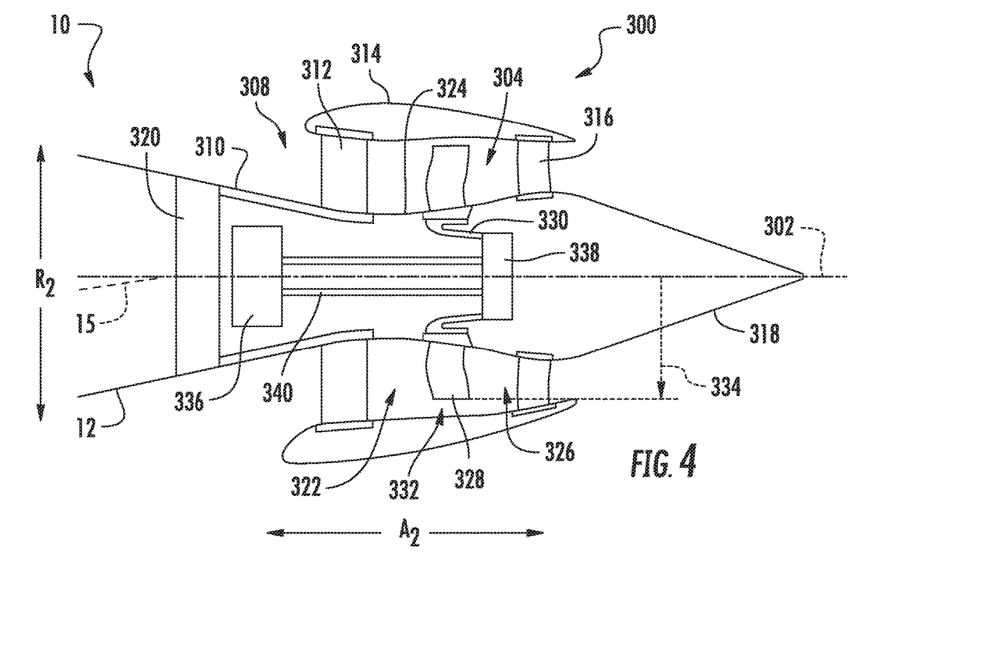
FIG. 4 is a schematic, cross-sectional view of an aft engine in accordance with an exemplary embodiment of the present disclosure.

Referring now to FIG. 4, a schematic, cross-sectional side view of an electric propulsion engine in accordance with various embodiments of the present disclosure is provided. The electric propulsion engine depicted is mounted to an aircraft 10 at an aft end 18 of the aircraft 10 and is configured to ingest a boundary layer air. Accordingly, for the embodiment depicted, the electric propulsion engine is configured as a boundary layer ingestion (BLI), aft fan (referred to hereinafter as "BLI fan 300"). The BLI fan 300 may be configured in substantially the same manner as the BLI fan 106 described above with reference to FIGS. 1 and 2 and the aircraft 10 may be configured in substantially the same manner as the exemplary aircraft 10 described above with reference to FIGS. 1 and 2.

As shown in FIG. 4, the BLI fan 300 defines an axial direction A2 extending along a longitudinal centerline axis 302 (or center axis) that extends therethrough for reference, as well as a radial direction R2 and a circumferential direction C2 (a direction extending about the axial direction A2, not shown). Additionally, the aircraft 10 defines a mean line 15 extending therethrough.

In general, the BLI fan 300 includes a fan 304 rotatable about the centerline axis 302 and a structural support system 308. The structural support system 308 is configured for mounting the BLI fan 300 to the aircraft 10, and for the embodiment depicted generally includes an inner frame support 310, a plurality of forward support members 312, an outer nacelle 314, a plurality of aft support members 316, and a tail cone 318. As is depicted, the inner frame support 310 is attached to a bulkhead 320 of the fuselage 12. The plurality of forward support members 312 are attached to the inner frame support 310 and extend outward generally along the radial direction R2 to the nacelle 314. The nacelle 314 defines an airflow passage 322 with an inner casing 324 of the BLI fan 300, and at least partially surrounds the fan 304. Further, for the embodiment depicted, the nacelle 314 extends substantially three hundred and sixty degrees (360°) around the mean line 15 of the aircraft 10. The plurality of aft support members 316 also extend generally along the radial direction R2 from, and structurally connect, the nacelle 314 to the tail cone 318.

In certain embodiments, the forward support members 312 and the aft support members 316 may each be generally spaced along the circumferential direction C2 of the BLI fan 300. Additionally, in certain embodiments the forward support members 312 may be generally configured as inlet guide vanes and the aft support members 316 may generally be configured as outlet guide vanes. If configured in such a manner, the forward and aft support members 312, 316 may direct and/or condition an airflow through the airflow passage 322 of the BLI fan 300. Notably, one or both of the forward support members 312 or aft support members 316 may additionally be configured as variable guide vanes. For example, the support member may include a flap (not shown) positioned at an aft end of the support member for directing a flow of air across the support member.

It should be appreciated, however, that in other exemplary embodiments, the structural support system 308 may instead include any other suitable configuration and, e.g., may not include each of the components depicted and described above. Alternatively, the structural support system 308 may include any other suitable components not depicted or described above.

The BLI fan 300 additionally defines a nozzle 326 between the nacelle 314 and the tail cone 318. The nozzle 326 may be configured to generate an amount of thrust from the air flowing therethrough, and the tail cone 318 may be shaped to minimize an amount of drag on the BLI fan 300. However, in other embodiments, the tail cone 318 may have any other shape and may, e.g., end forward of an aft end of the nacelle 314 such that the tail cone 318 is enclosed by the nacelle 314 at an aft end. Additionally, in other embodiments, the BLI fan 300 may not be configured to generate any measurable amount of thrust, and instead may be configured to ingest air from a boundary layer of air of the fuselage 12 of the aircraft 10 and add energy/speed up such air to reduce an overall drag on the aircraft 10 (and thus increase a net thrust of the aircraft 10).

Referring still to FIG. 4, the fan 304 includes a plurality of fan blades 328 and a fan shaft 330. The plurality of fan blades 328 are attached to the fan shaft 330 and spaced generally along the circumferential direction C2 of the BLI fan 300. As depicted, the plurality fan blades 328 are, for the embodiment depicted, at least partially enclosed by the nacelle 314.

The fan 304 of the BLI fan 300 defines a fan pressure ratio ($R_{FP}$). As used herein, the term "fan pressure ratio" refers to a ratio of a discharge pressure of a fan to an inlet pressure of the fan during operation of the fan. Accordingly, for the exemplary BLI fan 300 depicted in FIG. 4, the fan pressure ratio, $R_{FP}$, refers to a ratio of a pressure downstream of the fan 304 to a pressure upstream of the fan 304 during operation of the BLI fan 300. An amount of thrust generated by the BLI fan 300 may be directly related to the fan pressure ratio, $R_{FP}$, of the fan 304. Notably, as used herein, the term "fan pressure ratio" generally refers to a fan pressure ratio rating for the fan, such as a maximum fan pressure ratio of the fan as may be achieved through an entire flight envelope.

In certain exemplary embodiments, the plurality of fan blades 328 may be attached in a fixed manner to the fan shaft 330, or alternatively, the plurality of fan blades 328 may be rotatably attached to the fan shaft 330. For example, the plurality of fan blades 328 may be attached to the fan shaft 330 such that a pitch of each of the plurality of fan blades 328 may be changed, e.g., in unison, by a pitch change mechanism (not shown). Changing the pitch of the plurality of fan blades 328 may increase an efficiency of the BLI fan 300 and/or may allow the BLI fan 300 to achieve a desired thrust profile. With such an exemplary embodiment, the BLI fan 300 may be referred to as a variable pitch BLI fan.

Additionally, each of the plurality of fan blades 328 define a tip 332 at an outer end of the respective fan blade 328 along the radial direction R2. During operation of the BLI fan 300, each fan blade 328 may accordingly define a fan blade tip speed $S_{FB}$. As will be appreciated, the fan blade tip speed $S_{FB}$ may generally be determined by multiplying a rotational speed of the fan blades 328 and fan shaft 330 by a radius 334 of the tip 332 of the respective fan blade 328 along the radial direction R2, relative to the centerline axis 302. Further, the fan blade tip speed $S_{FB}$ may, in certain embodiments, be corrected to a standard day condition, such that fan blade tip speed $S_{FM}$ referred to herein may be equal to: $S_{FB,ACT} \times \sqrt{T_{AMB} \div 518.67°Ra}$, where $S_{FB,ACT}$ equals the actual fan blade tip speed and $T_{AMB}$ equals an ambient temperature in Rankine.

Moreover, for the embodiment depicted, the fan 304 is rotatable about the centerline axis 302 of the BLI fan 300 by an electric machine. More particularly, for the embodiment depicted, the electric machine is an electric motor 336 and the BLI fan 300 additionally includes a power gearbox 338 mechanically coupled to the electric motor 336. Additionally, the fan 304 is mechanically coupled to the power gearbox 338. For example, for the embodiment depicted, the fan shaft 330 extends to and is coupled to the power gearbox 338, and a driveshaft 340 of the electric motor 336 extends to and is also coupled to the power gearbox 338. Accordingly, for the embodiment depicted, the fan 304 is rotatable about the central axis 302 of the BLI fan 300 by the electric motor 336 through the power gearbox 338.

The power gearbox 338 may include any type of gearing system for altering a rotational speed between the driveshaft 340 and the fan shaft 330. For example, the power gearbox 338 may be configured as a star gear train, a planetary gear train, or any other suitable gear train configuration. Additionally, the power gearbox 338 may define a gear ratio, which as used herein, refers to a ratio of a rotational speed of the driveshaft 340 to a rotational speed of the fan shaft 330. In certain exemplary embodiments, the gear ratio of the power gearbox 338 may be greater than about 1:1 and less than about 1:5. For example, in certain embodiments, the gear ratio of the power gearbox 338 may be between about 1:1.5 and about 1:3.5, such as between about 1:1.2 and about 1:2.75. It should be appreciated, that as used herein, terms of approximation, such as "about" or "approximately," refer to being within a 10% margin of error.

Referring still to the exemplary embodiment of FIG. 4, the electric motor 336 is located at least partially within the fuselage 12 of the aircraft 10. More specifically, the fan 304 is positioned forward of the power gearbox 338 along the central axis 302 of the BLI fan 300, and the electric motor 336 is positioned forward of the fan 304 along the central axis 302 of the BLI fan 300. Conventional design teaches that the power gearbox 338 should be positioned at a forward location, as the power gearbox may require lubrication oil to operate, and a forward position may provide convenience with regard to supplying lubrication oil and scavenging lubrication oil. However, the inventors of the present disclosure have discovered that positioning the power gearbox 338 proximate an aft end of BLI fan 300 may allow for the power gearbox 338 to be relatively accessible for, e.g., repair of the power gearbox 338. For example, in certain embodiments, the tail cone 318 of the BLI fan 300 may be removable (or may include one or more of movable sections), such that the power gearbox 338 is exposed for repair.

Further, in certain exemplary embodiments, the BLI fan 300 may be configured with a gas-electric propulsion system, such as the gas-electric propulsion system 100 described above with reference to FIGS. 1 and 2. In such an embodiment, the electric motor 336 may receive power from one or both of an energy storage device or an electric generator—such as the energy storage device 110 or electric generator 108 of FIGS. 1 and 2.

Figure 5:
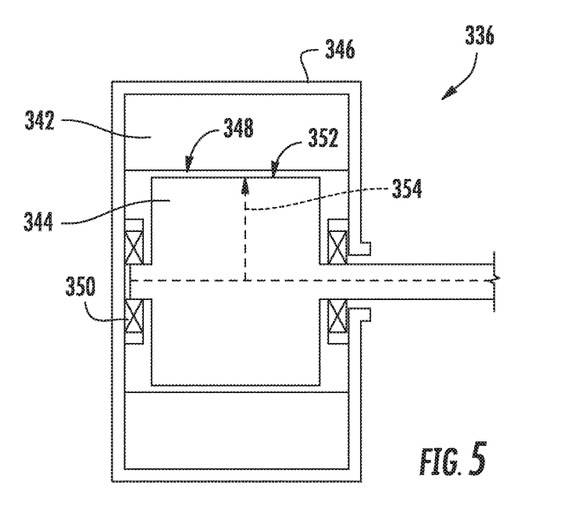
FIG. 5 is a close-up, cross-sectional view of an electric motor for the exemplary aft engine of FIG. 4 in accordance with an exemplary embodiment of the present disclosure.

Furthermore, referring now also to FIG. 5, providing a schematic, cross-sectional view of the electric motor 336, the electric motor 336 is generally configured as an inrunner electric motor 336. More particularly, the exemplary electric motor 336 depicted includes a stator 342, a rotor 344 positioned within the stator 342, and an outer casing 346 enclosing the stator 342 and rotor 344. However, in other embodiments, the electric motor 336 may instead be configured as an outerunner (or out-running) electric motor, such that a position of the stator 342 and rotor 344 are reversed and the rotor 344 is instead location radially outside of the stator 342.

As will be appreciated, the stator 342 may include one or more electromagnetic coils (not shown), and the rotor 344 may include a plurality of segmented permanent magnets (not shown) having alternating magnetic poles. The rotor 344 and stator 342 together define an air gap 348 therebetween along the radial direction R2. The rotor 344 is mounted to an axle or output shaft, which for the embodiment depicted is configured as, or coupled to, the driveshaft 340. The electric motor 336 additionally includes a plurality of bearings 350 within the outer casing 346 facilitating rotation of the rotor 344. It should be appreciated, however, that in other exemplary embodiments, the electric motor 336 may instead have any other suitable configuration. For example, in other exemplary embodiments, the electric motor 336 may be positioned at any other suitable location within, e.g., the fuselage 12 of the aircraft 10 or the BLI fan 300.

The exemplary electric motor 336 additionally defines an electric machine tip speed $S_{EM}$ during operation of the BLI fan 300 and electric motor 336. The electric machine tip speed $S_{EM}$ refers to a speed of the rotor 344 at an interface of the rotor 344 with the air gap 348 (e.g., a surface speed or linear speed of the rotor 344). Accordingly, as the electric motor 336 depicted is configured as an inrunner electric motor, the electric machine tip speed $S_{EM}$ refers to a speed of an outer edge 352 of the rotor 344. As will be appreciated, such an electric machine tip speed $S_{EM}$ may be calculated by multiplying a rotational speed of the rotor 344 of the electric motor 336 by a radius 354 of the outer edge 352 of the rotor 344 along the radial direction R2 relative to the axial centerline 302.

Notably, the exemplary BLI fan 300 depicted defines a ratio of the fan blade tip speed $S_{FB}$ to electric machine tip speed $S_{EM}$ ($S_{FB}:S_{EM}$, "tip speed ratio, $R_{TS}$"). The tip speed ratio, $R_{TS}$, defines a relationship to the fan pressure ratio, $R_{FP}$, which the inventors of the present disclosure have determined may have an effect on an efficiency of the fan 304 and BLI fan 300. Specifically, the inventors of the present disclosure have found that in order to increase an efficiency of the BLI fan 300, it may be beneficial to design the BLI fan 300 to have a tip speed ratio, $R_{TS}$, that accounts for a desired fan pressure ratio, $R_{FP}$. For example, during operation of the BLI fan 300, the inventors have found that a desired efficiency may be accomplished by configuring the fan 304 to have a tip speed ratio, $R_{TS}$, within about twenty percent (20%) of the following equation: $1.68 \times R_{FP} - 0.518$. More particularly, in certain embodiments, a desired efficiency may be accomplished by configuring the fan 304 to have a tip speed ratio, $R_{TS}$, within about ten percent (10%), or further, within about five percent (5%) of the following equation: $1.68 \times R_{FP} - 0.518$.

In certain exemplary embodiments, the above relationship between fan pressure ratio, $R_{FP}$, and tip speed ratio, $R_{TS}$, may provide for a fan 304 having a desired efficiency when the fan pressure ratio, $R_{FP}$, is greater than one (1) and less than about three (3). For example, the above relationship between fan pressure ratio, $R_{FP}$, and tip speed ratio, $R_{TS}$, may provide for a fan 304 having a desired efficiency when the fan pressure ratio, $R_{FP}$, is greater than one (1) and less than about 2.75, less than about 2.5, or less than about two (2).

Additionally, an electric machine configured according to the exemplary electric machine, or rather electric motor 336, described above may operate during standard day, maximum speed conditions with an electric machine tip speed $S_{EM}$ between about 350 feet per second (ft/s) and about 750 ft/s. More particularly, an electric machine in accordance with one or more exemplary embodiments of the present disclosure may operate during standard day, maximum speed conditions with an electric machine tip speed $S_{EM}$ between about 450 feet per second (ft/s) and about 700 ft/s, such as between about 550 ft/s and about 650 ft/s.

Accordingly, in a non-limiting, example embodiment of the present disclosure, the fan 304 of the BLI fan 300 may define a fan pressure $R_{FP}$ of about 1.25. Using the equation $R_{TS} = 1.68 \times R_{FP} - 0.518$, the tip speed ratio $R_{TS}$ is approximately 1.58. The electric motor 336, power gearbox 338, and fan 304 may then be sized such that the effective tip speed ratio $R_{TS}$ is approximately 1.58. An electric machine tip speed $S_{EM}$ of an electric machine in accordance with the present disclosure (e.g., electric motor 336) may be approximately 600 ft/s. Accordingly, with this exemplary embodiment, the fan blade tip speed $S_{FB}$ may be approximately 948 ft/s.

As an illustrative aspect of the present disclosure, a method for operating a propulsion system for an aircraft is provided. The propulsion system may be the exemplary propulsion system 100 described above with reference to FIGS. 1 through 5. Accordingly, the exemplary propulsion system may include an electric propulsion engine, such as the exemplary BLI fan 300, including an electric motor and a fan. The electric motor may define an electric machine tip speed and the fan may define a fan tip speed. The method includes operating the fan of the electric propulsion engine to define a fan pressure ratio greater than one (1) and less than about three (3). A ratio of the fan blade tip speed to the electric machine tip speed is within 20% of the equation: $1.68 \times R_{FP} - 0.518$.

An electric propulsion engine in accordance with one or more embodiments of the present disclosure may provide for an electric propulsion engine having a desired efficiency and power density (e.g., an amount of thrust per unit volume of air flowing through the electric propulsion machine). Specifically, the inventors of the present disclosure have found that an electric propulsion engine defining a tip speed ratio having a relationship to a fan pressure ratio of a fan of the electric propulsion engine in accordance with one or more the embodiments described above may result in an electric propulsion engine having an increased efficiency and power density across various sizes of fans and electric motors. Such a configuration may be accomplished by sizing the electric motor, fan blades, and if necessary, inclusion of a power gearbox having a specified gear ratio, based on an anticipated fan pressure ratio during operation of the engine.

Figure 6:
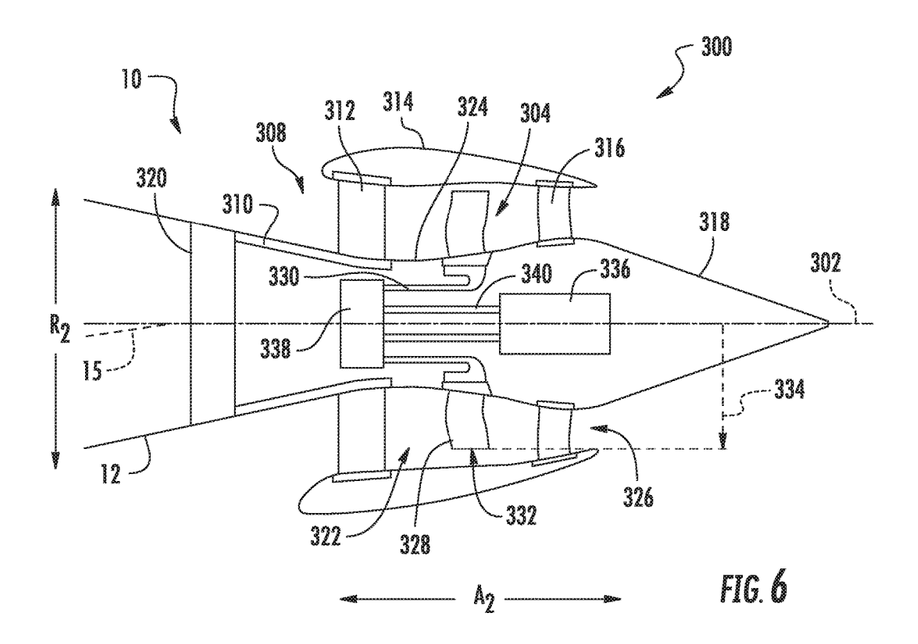
FIG. 6 is a schematic, cross-sectional view of an aft engine in accordance with another exemplary embodiment of the present disclosure

Referring now to FIG. 6, a BLI fan 300 in accordance with another exemplary embodiment of the present disclosure is depicted. The exemplary BLI fan 300 depicted in FIG. 6 may be configured in substantially the same manner as exemplary BLI fan 300 depicted in FIG. 4 and described above. Accordingly, the same or similar numbering may refer to the same or similar part.

As depicted, the exemplary BLI fan 300 generally includes a fan 304 and a structural support system 308. As with the embodiment described above, the structural support system 308 includes a plurality of struts 310, a plurality of forward support members 312, an outer nacelle 314, a plurality of aft support members 316, and a tail cone 318. Additionally, the fan 304 generally includes a plurality of fan blades 328 at least partially enclosed within the outer nacelle 314 and a fan shaft 330. For the embodiment depicted, the exemplary fan 304 is rotatable about a central axis 302 of the BLI fan 300 by an electric motor 336, or more particularly, the fan 304 is rotatable about the central axis 302 of the BLI fan 300 by the electric motor 336 through a power gearbox 338. The electric motor 336 is mechanically coupled to a driveshaft 340, which extends to an attaches to the power gearbox 338. The power gearbox 338 is, in turn, attached to the fan shaft 330 for rotating the fan shaft 330.

However, for the embodiment depicted in FIG. 6, a relative positioning of the fan 304, the power gearbox 338, and the electric motor 336 has been altered. More specifically, for the embodiment depicted in FIG. 6, the power gearbox 338 is positioned forward of the fan 304, and forward of the electric motor 336 along the central axis 302 of the BLI fan 300. Further, the fan 304 is, for the embodiment depicted, positioned forward of the electric motor 336 along the central axis 302 of the BLI fan 300. However, in other embodiments, the fan 304 may overlap with the electric motor 336 along the central axis 302, or may even be positioned aft of the electric motor 336 along the central axis 302. Regardless, such a configuration may allow for greater ease of access to the electric motor 336 during, e.g., maintenance or repair of the electric motor 336. For example, in certain exemplary embodiments, the tail cone 318, or a part thereof, may be removable, such that the electric motor 336 may be relatively easily accessible during maintenance or repair operations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft having a fuselage and an aft end, the propulsion system comprising:
   an electric propulsion engine configured to be mounted to the aircraft, the propulsion engine defining a central axis and comprising:
   an electric machine defining an electric machine tip speed during operation of the propulsion engine;
   a fan rotatable about the central axis of the electric propulsion engine with the electric machine, the fan defining a fan pressure ratio ($R_{FP}$), the fan pressure ratio being a fan pressure ratio rating for the fan, and the fan comprising a plurality of fan blades, each fan blade defining a fan blade tip speed during operation of the electric propulsion engine, the electric propulsion engine defining a ratio of fan blade tip speed to electric machine tip speed; and
   a power gearbox mechanically coupled to the electric machine, the fan mechanically coupled to the power gearbox and rotatable about the central axis of the electric propulsion engine by the electric machine through the power gearbox;
   wherein during operation of the electric propulsion engine, the ratio of fan blade tip speed to electric machine tip speed is within twenty percent of the following formula: $1.68 \times R_{FP} - 0.518$.

2. The propulsion system of claim 1, wherein the ratio of fan blade tip speed to electric machine tip speed is within ten percent of the following formula: $1.68 \times R_{FP} - 0.518$.

3. The propulsion system of claim 1, wherein the fan pressure ratio, $R_{FP}$, is greater than one and less than about three during operation of the electric propulsion engine.

4. The propulsion system of claim 1, wherein the electric machine is an electric motor, and wherein the fan is rotatable about the central axis of the electric propulsion engine by the electric motor.

5. The propulsion system of claim 1, wherein the power gearbox defines a gear ratio between about 1:1 and about 1:5.

6. The propulsion system of claim 1, wherein the fan is positioned forward of the power gearbox along the central axis of the electric propulsion engine.

7. The propulsion system of claim 6, wherein the electric motor is positioned forward of the fan along the central axis of the electric propulsion engine.

8. The propulsion system of claim 1, wherein the power gearbox is positioned forward of the fan along the central axis of the electric propulsion engine and forward of the electric motor along the central axis of the electric propulsion engine, and wherein the fan is positioned forward of the electric motor along the central axis of the electric propulsion engine.

9. The propulsion system of claim 4, wherein the electric propulsion engine is configured as a boundary layer ingestion fan.

10. The propulsion system of claim 4, wherein the electric propulsion system is configured as an aft fan configured to be mounted at the aft end of the aircraft, and along a mean line of the aircraft.

11. The propulsion system of claim 4, further comprising:
a gas turbine engine; and
an electric generator operable with the gas turbine engine, and wherein the electric motor is in electrical communication with the electric generator.

12. The propulsion system of claim 1, further comprising:
a structural support system, and wherein the structural support system is configured for mounting to a bulkhead of the fuselage of the aircraft when the propulsion engine is mounted to the aircraft.

13. A method for operating a propulsion system for an aircraft, the propulsion system comprising a propulsion engine comprising an electric machine and a fan, the electric machine defining an electric machine tip speed and the fan defining a fan tip speed, the method comprising:
operating the fan of the propulsion engine to define a fan pressure ratio ($R_{FP}$) greater than one and less than about three, a ratio of fan blade tip speed to electric machine tip speed being within twenty percent of the formula $1.68 \times R_{FP} - 0.518$;
wherein the propulsion engine is an electric propulsion engine comprising a power gearbox mechanically coupled to the electric machine, the fan mechanically coupled to the power gearbox and rotatable about the central axis of the electric propulsion engine by the electric machine through the power gearbox.

14. The method of claim 13, wherein the ratio of fan blade tip speed to electric machine tip speed is within about ten percent of the formula $1.68 \times R_{FP} - 0.518$.

15. The method of claim 13, wherein the ratio of fan blade tip speed to electric machine tip speed is within about five percent of the formula $1.68 \times R_{FP} - 0.518$.

16. The method of claim 13 wherein the propulsion engine is a boundary layer ingestion aft engine.

17. The propulsion system of claim 1, wherein the electric machine is an electric motor, wherein the
power gearbox is mechanically coupled to the electric motor, wherein the fan is mechanically coupled to the power gearbox and rotatable about the central axis of the electric propulsion engine by the electric motor through the power gearbox, wherein the power gearbox defines a gear ratio between about 1:1.5 and about 1:3.5, and wherein the ratio of fan blade tip speed to electric machine tip speed is within ten percent of the following formula: $1.68 \times R_{FP} - 0.518$.

18. The propulsion system of claim 17, wherein the fan pressure ratio, $R_{FP}$, is greater than one and less than about 2.5 during operation of the electric propulsion engine.

19. The propulsion system of claim 18, wherein the electric machine tip speed of the electric motor during operation of the propulsion engine is between about 350 feet per second and about 750 feet per second.

20. The propulsion system of claim 1, wherein the electric machine and the power gearbox are each arranged along the central axis of the electric propulsion engine.

* * * * *